(12) United States Patent
Brown

(10) Patent No.: US 6,865,432 B2
(45) Date of Patent: Mar. 8, 2005

(54) OPTIMIZATION OF MANUFACTURING EQUIPMENT CAPACITIES IN A BATCH MANUFACTURING PROCESS

(76) Inventor: Peter G. Brown, 63 Clearwater Rd., Newton, MA (US) 02462

(*) Notice: Subject to any disclaimer, the term of this patent is extended or adjusted under 35 U.S.C. 154(b) by 0 days.

(21) Appl. No.: 10/152,348

(22) Filed: May 22, 2002

(65) Prior Publication Data

US 2003/0033045 A1 Feb. 13, 2003

Related U.S. Application Data

(60) Provisional application No. 60/292,342, filed on May 22, 2001.

(51) Int. Cl.[7] ............................................. G06F 19/00
(52) U.S. Cl. .......................... 700/99; 700/102; 700/103
(58) Field of Search ........................... 700/99, 97, 100, 700/102

(56) References Cited

U.S. PATENT DOCUMENTS 6,415,194 B1 * 7/2002 Gleditsch et al. ............. 700/99
6,560,501 B1 * 5/2003 Walser et al. .................. 700/99

OTHER PUBLICATIONS

SuperPro Designer® User's Guide, Intelligen, Inc, Scotch Plains, NJ, (date unknown).

* cited by examiner

Primary Examiner—Leo Picard
Assistant Examiner—Carlos Ortiz-Rodriguez
(74) Attorney, Agent, or Firm—Sterne, Kessler, Goldstein & Fox P.L.L.C.

(57) ABSTRACT

In an effort to achieve the lowest cost of goods (COG) possible, a key objective in batch manufacturing is to maximize equipment utilization so that the capacity and size of equipment per batch cycle is the smallest possible for a given batch production capacity. This optimization of equipment utilization minimizes equipment and direct utility costs per batch, as well as reduces the physical space and the associated utilities required to support manufacturing operations. The present invention provides a process of: (1) determining the optimal number of batch cycles per year for a required annual production capacity; and (2) determining the optimal number of equipment cycle iterations per batch cycle in a manner that: (a) creates the smallest batch sizes possible; and (b) achieves higher equipment utilization per batch cycle, thereby reducing the capacity and size of equipment required to produce a given batch quantity of product.

2 Claims, 3 Drawing Sheets

Figure 1 - Determination of Optimal Batch Cycle Offset for a Batch Manufacturing Process Figure 2 - Determination of Optimal Number of Unit Operation Cycles/ Cumulative Unit Operation Duration for Each Unit Operation in a Batch Manufacturing Process

OPTIMIZATION OF MANUFACTURING EQUIPMENT CAPACITIES IN A BATCH MANUFACTURING PROCESS

CROSS REFERENCE TO RELATED APPLICATIONS

This application claims priority to U.S. Provisional Patent Application No. 60/292,342, filed May 22, 2001, which is incorporated by reference herein in its entirety.

BACKGROUND OF THE INVENTION

1. Field of the Invention

The present invention relates generally to large scale batch manufacturing facilities, and more specifically to the optimization within such facilities.

2. Related Art

Batch manufacturing is a dominant method of producing a number of valuable products such as food, beverages, specialty chemicals, pharmaceuticals, etc. An overview of the biopharmaceutical production process and its associated plant design, for example, can be found in U.S. Pat. No. 6,311,095, issued Oct. 30, 2001 and U.S. patent application Ser. No. 09/373,793, filed Aug. 13, 1999, both having common inventorship and are hereby incorporated by reference in their entireties.

The scheduling of equipment utilization in these batch processes tends to be complex relative to other industries that use continuous or repetitive manufacturing procedures. This complexity often results in an oversizing and/or underutilization of equipment in batch processes to meet a required production capacity per batch cycle due to a general lack of well-defined rules for batch process scheduling.

In batch manufacturing, repeating cycles of product batches are often scheduled to begin at a fixed repeating interval or batch cycle offset (BCO). For example, a new batch of a pharmaceutical product may begin each Monday morning at 7 AM. In this case, the BCO would be equal to 7 days. Determining the BCO is often an arbitrary practice based on convenience rather than clearly defined process optimization procedures. In addition, batch processes are frequently designed to have a minimal batch cycle duration (BCD) regardless of the duration of the BCO. Often, however a short BCD is required due to the instability of the product. In other cases, the BCD it is kept to a minimum in order to minimize the overlap of concurrent batch cycles and minimize the complexity of scheduling in manufacturing operations. (This overlap factor is a function of the BCD divided by the BCO. For example if a batch process has a BCO=2 days and a BCD=10 days then when the process reaches steady state there will be 10/2=5 batch process at different stages of completion simultaneously at any given moment provided the values for BCO and BCD remain constant.)

Existing batch design practices typically focus on cycling equipment for a given unit operation one or more iterations per batch cycle in order to increase equipment utilization. These practices, however, fail to define an optimal relationship between these cycles and the BCO that both maximizes the number of theoretical batches per year for a given production quantity and maximizes the number of equipment cycles per batch. As a result, these conventional practices do not allow for optimal equipment utilization and lowest cost of goods (COG) for batch manufacturing.

SUMMARY OF THE INVENTION

In an effort to achieve the lowest cost of goods (COG) possible, a key objective in batch manufacturing is to maximize equipment utilization so that the capacity and size of equipment per batch cycle is the smallest possible for a given batch production capacity. This optimization of equipment utilization minimizes equipment and direct utility costs per batch, as well as reduces the physical space and the associated utilities required to support manufacturing operations. The present invention provides a means of: (1) determining the optimal number of batch cycles per year for a required annual production capacity; and (2) determining the optimal number of equipment cycle iterations per batch cycle in a manner that: (a) creates the smallest batch sizes possible; and (b) achieves higher equipment utilization per batch cycle, thereby reducing the capacity and size of equipment required to produce a given batch quantity of product.

The foregoing and other features and advantages of the invention will be apparent from the following, more particular description of a preferred embodiment of the invention.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

When appropriate emphasis is placed on achieving an optimal process design that produces the lowest COG, minimizing batch equipment capacities for a given annual production requirement (APR) becomes a focus of attention. As a first step, this minimization of batch equipment capacities is achieved by determining the optimal BCO for each batch cycle. As a second step, this minimization of batch equipment capacities is achieved by distributing the APR over the maximum possible number of batches per year based upon the optimal BCO and in a manner that takes into account the loss of available manufacturing time due to plant shut downs, equipment maintenance and equipment turnaround times. As a third step, the minimization of batch equipment capacities is achieved by cycling the equipment associated with each given unit operation the maximum number cycles possible per batch cycle in order to achieve high equipment utilization factors that minimize the size of equipment for a given batch capacity. This latter goal can be constrained by the stability of the product at a given step in the batch manufacturing process. An ideal relationship between the BCO, unit operation cycles and product stability has not been previously defined in the prior art.

Figure 1:
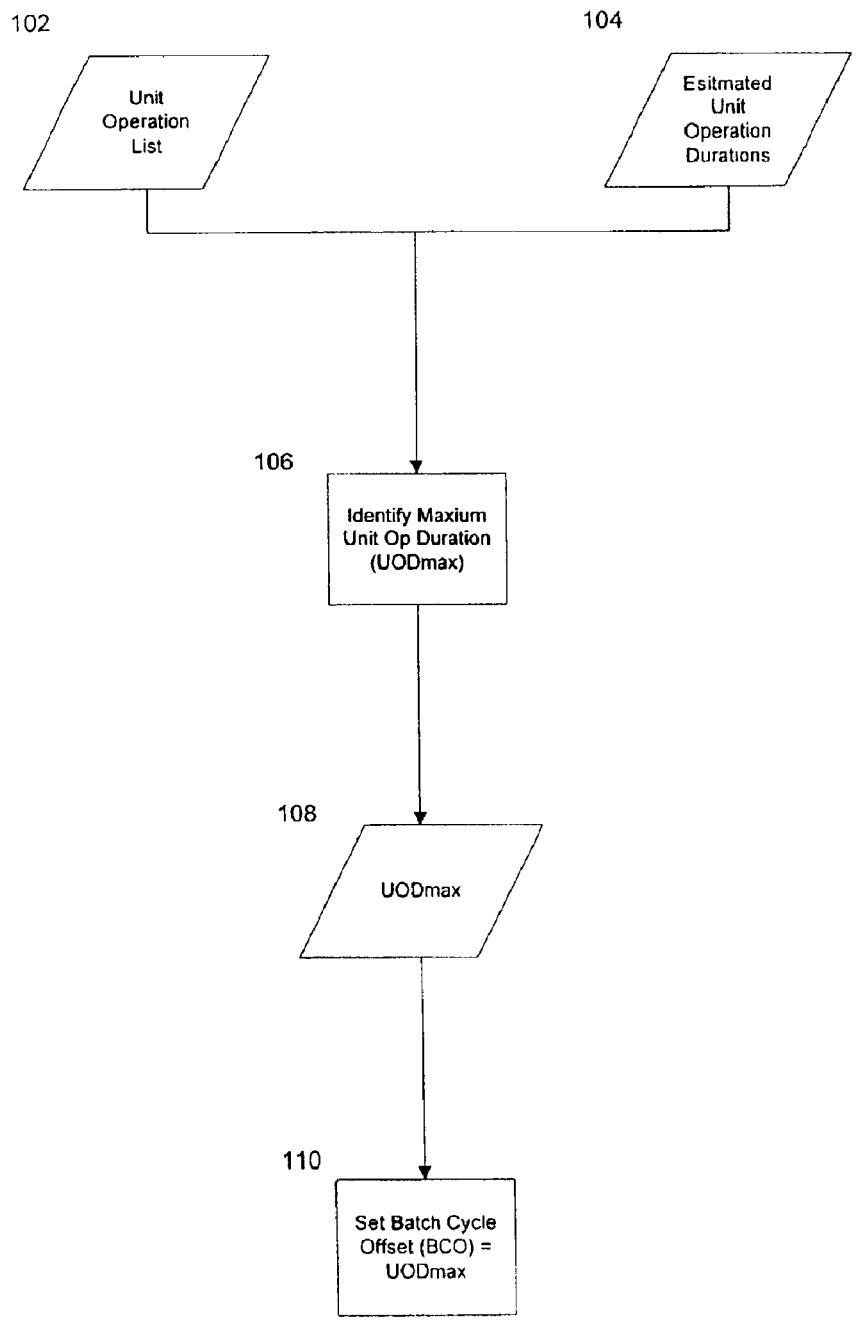
FIG. 1 illustrates a flow diagram of the process for determining the optimal batch cycle offset for a batch manufacturing process according to the present invention.
Figure 2:
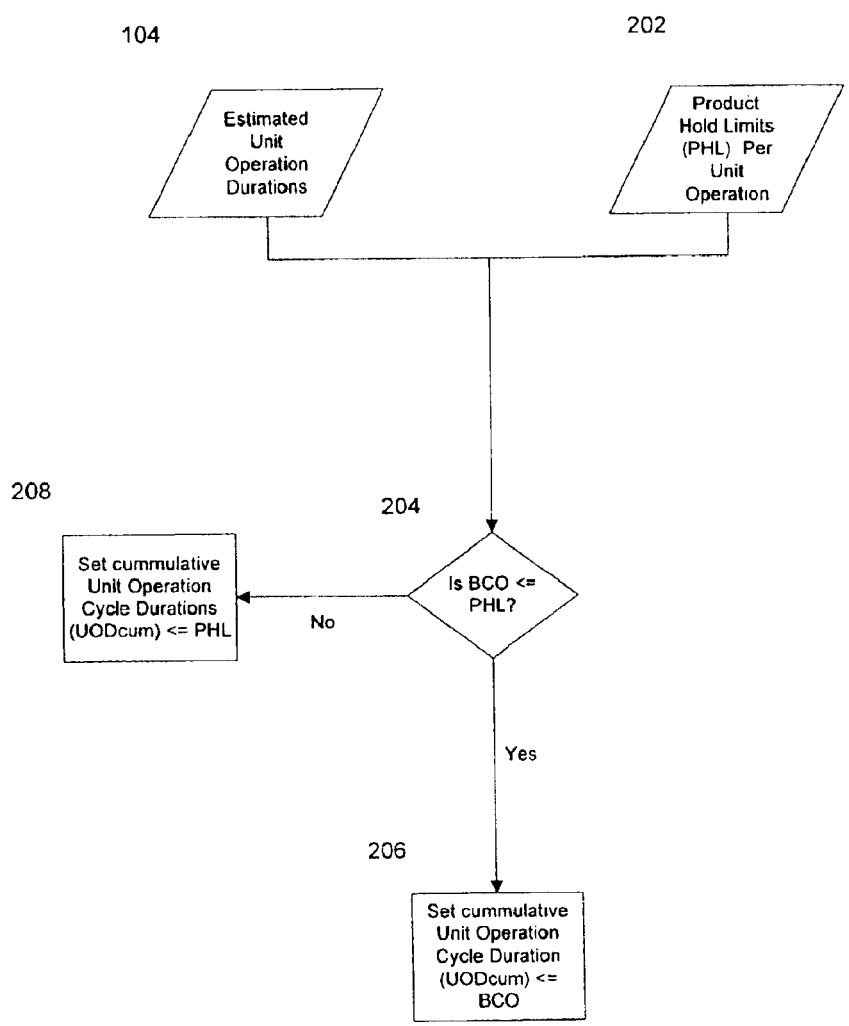
FIG. 2 illustrates a flow diagram of the process determining the optimal number of unit operation cycles/cumulative unit operation duration for each unit operation in a batch manufacturing process according to the present invention.

The preferred embodiment of the present invention is now explained with reference to FIG. 1 (steps 102–110) and FIG. 2 (steps 104–208).

The unit operation sequence for production of the product is determined (step 102). The unit operation sequence is the series of unit operations that are required to produce the product. Each unit operation is an individual step in the manufacturing process with an associated set of manufacturing equipment. The unit operation list is the list of unit operations that make up the unit operation sequence and their associated sequence information. The unit operation sequence information is the information that defines the scheduling cycles for each of the unit operations in the unit operation list. Each unit operation has an associated duration, which is also obtained (step 104).

In the preferred embodiment of the present invention, an estimate is made of the longest unit operation duration ("UODmax") among all the unit operations in a given batch process (steps 106–108). Once determined, the BCO is set equal to UODmax, and synchronized to the start of a work shift that begins a given production schedule or time line (step 110). Next, the maximum length of time that the product can be held at any given unit operation before completing that unit operation is determined (step 202). This is called the Product Hold Limit (PHL). If the BCO is less than or equal to the PHL for a given unit operation (step 204), then the number of unit operations cycles (UOC) for that unit operation is increased until the cumulative duration of these multiple unit operation cycles ("UODcum") is as close to the BCO as possible without exceeding the BCO (step 206). If the BCO is greater than the PHL for a given unit operation then the number of unit operations cycles for that unit operation is increased until UODcum is as close to the PHL as possible without exceeding the PHL (step 208).

In cases where a unit operation is part of a unit operation cluster cycle (or cycles per batch, optimization of the cumulative duration of multiple unit operation cluster cycles (CCDcum) is treated in the same manner as the above UODcum with respect to the BCO and PHL in order to achieve the highest equipment utilization possible for the associated equipment in each batch cycle.

Setting the BCO to the UODmax allows the shortest BCO possible and the greatest number of batch cycles per APR, thereby minimizing the capacity requirements per batch cycle. Second, establishing the above relationship between the BCO, PHL and UODcum (or UCDcum) minimizes the capacity of the respective batch manufacturing equipment for each respective unit operation. Even though this latter approach would increase the BCD, which in turn would tend to reduce the number of possible batch cycles per year, this effect is offset by the significant increase of batch cycles per year made possible by reducing the BCO to a minimal value (i.e., UODmax) and reducing the required batch capacity accordingly.

In determining the optimal relationship between the BCO, PHL and UODcum (or UCDcum), labor and process automation are two variables that must be evaluated simultaneously in order to achieve the lowest possible COG. As the UOCs and UCCs are increased and equipment capacities per batch cycle are lowered, there is often an increase in labor related to the increase in respective equipment cycles. This increased labor can be offset by an increase in process automation, which in turn can cause a marginal increase in the installed cost (includes equipment purchase cost, as well as costs for design, engineering, installation and qualification) for the respective process equipment. Determination of an optimal relationship between capital expense and labor/automation as UOCs and UCCs are increased is typically an iterative process that can be done either manually or via existing optimization algorithms (e.g., The Simplex Method which is well-know by those skilled in the relevant art(s)).

Figure 3:
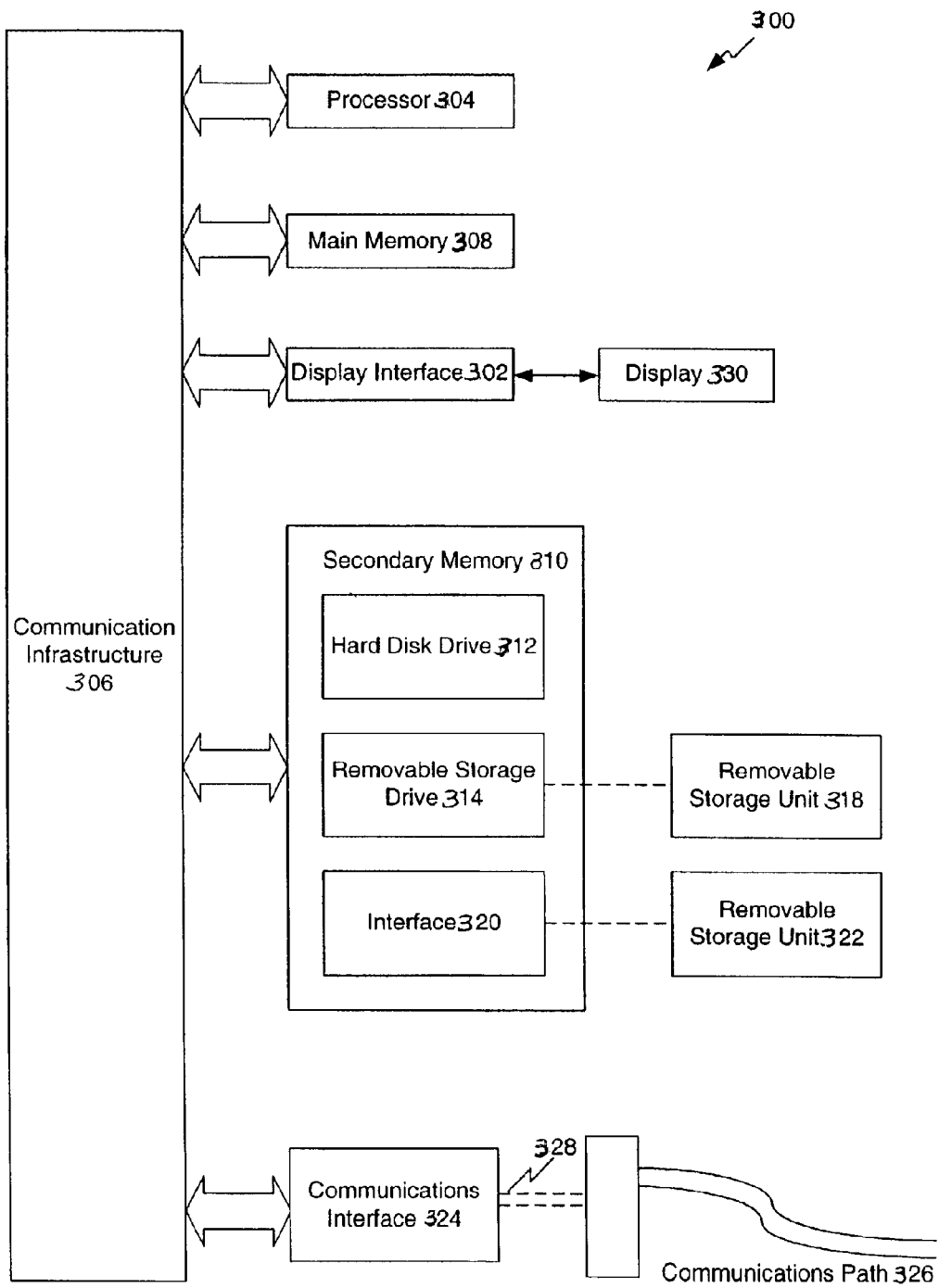
FIG. 3 is an example computer system useful for implementing the present invention.

The present invention may be implemented using hardware, software or a combination thereof and may be implemented in a computer system or other processing system. In fact, in one embodiment, the invention is directed toward one or more computer systems capable of carrying out the functionality described herein. An example computer system 300 is shown in FIG. 3. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals which can be electronic, electromagnetic, optical or other signals capable of being received by communications interface 324. These signals 326 are provided to communications interface via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for optimizing equipment utilization and capacity within a batch manufacturing facility, comprising:

(1) determining a unit operation sequence for production of a product, wherein said unit operation sequence is a series of unit operations that are required to produce said product;

(2) determining an associated duration for each unit operation in said unit operation sequence;

(3) determining the longest unit operation duration (UODmax) among said unit operations forming said unit operation sequence;

(4) setting a batch cycle offset (BCO) parameter equal to UODmax;

(5) determining a maximum length of time said product can be held at any given unit operation before completing said given unit operation;

(6) if said BCO is less than or equal to said maximum length of time for a given unit operation, then the number of unit operation cycles for that unit operation is increased until a cumulative duration of these multiple unit operation cycles (UODcum) is as close to said BCO as possible without exceeding said BCO; and (7) If said BCO is greater than said maximum length of time for a given unit operation then the number of unit operation cycles for that unit operation is increased until UODcum is as close as said maximum length of time as possible without exceeding said maximum length of time.

2. The method of claim 1, further comprising defining minimum capacity requirements of the manufacturing equipment associated with a given unit operation based on steps (1) to (7) for a given batch cycle in the batch manufacturing facility.

* * * * *